United States Patent
Amihai et al.

(10) Patent No.: US 12,007,745 B2
(45) Date of Patent: Jun. 11, 2024

(54) APPARATUS FOR PREDICTING EQUIPMENT DAMAGE

(71) Applicant: ABB Schweiz AG, Baden (CH)

(72) Inventors: Ido Amihai, Bensheim (DE); Subanatarajan Subbiah, Neulussheim (DE); Arzam Muzaffar Kotriwala, Ladenburg (DE); Moncef Chioua, Montreal (CA)

(73) Assignee: ABB Schweiz AG, Baden (CH)

( * ) Notice: Subject to any disclaimer, the term of this patent is extended or adjusted under 35 U.S.C. 154(b) by 371 days.

(21) Appl. No.: 17/480,165

(22) Filed: Sep. 21, 2021

(65) Prior Publication Data
US 2022/0004163 A1 Jan. 6, 2022

Related U.S. Application Data

(63) Continuation of application No. PCT/EP2020/057459, filed on Mar. 18, 2020.

(30) Foreign Application Priority Data

Mar. 22, 2019 (EP) ..................... 19164552

(51) Int. Cl.
*G05B 23/02* (2006.01)
*G05B 19/4065* (2006.01)
(Continued)

(52) U.S. Cl.
CPC ....... *G05B 19/4065* (2013.01); *G05B 23/024* (2013.01); *G06F 18/23213* (2023.01); *G06N 3/045* (2023.01); *G05B 2219/37252* (2013.01)

(58) Field of Classification Search
CPC ............. H04W 72/52; H04W 28/0268; H04W 28/0289; H04W 72/02; H04W 72/56; H04W 72/21
See application file for complete search history.

(56) References Cited

U.S. PATENT DOCUMENTS

2016/0183856 A1* 6/2016 Pryor ................. A61B 5/14532
600/365
2016/0282847 A1 9/2016 Germann et al.
(Continued)

FOREIGN PATENT DOCUMENTS

WO WO 2019/028269 A2 2/2019

OTHER PUBLICATIONS

European Patent Office, Summons to Attend Oral Proceedings Pursuant to Rule 115(1) EPC in European Patent Application No. 19164552.2, 8 pp. (Jul. 18, 2023).
(Continued)

*Primary Examiner* — Kidest Bahta
(74) *Attorney, Agent, or Firm* — Leydig, Voit & Mayer, Ltd.

(57) ABSTRACT

An apparatus includes an input unit, a processing unit, and an output unit. The input unit is configured to provide the processing unit with sensor data for an item of equipment. The processing unit is configured to implement at least one machine learning algorithm, which has been trained on the basis of a plurality of calibration sensor data for the item of equipment. Training of the at least one machine learning algorithm includes processing the plurality of calibration sensor data to determine at least two clusters representative of different equipment states. The processing unit is configured to implement the at least one machine learning algorithm to process the sensor data to assign the sensor data to a cluster of the at least two clusters to determine an equipment state for the item of equipment. The output unit is configured to output the equipment state for the item of equipment.

11 Claims, 2 Drawing Sheets

(51) Int. Cl.
*G06F 18/23213* (2023.01)
*G06N 3/045* (2023.01)

(56) References Cited

U.S. PATENT DOCUMENTS

2016/0313216 A1* 10/2016 Pal .................... B23Q 17/0971
2017/0031329 A1* 2/2017 Inagaki .................... G06N 3/08
2018/0286034 A1* 10/2018 Lim .................... G06V 10/764

OTHER PUBLICATIONS

Aczon et al., "Dynamic Mortality Risk Predictions in Pediatric Critical Care Using Recurrent Neural Networks," *arXiv preprint arXiv:1701.06675*, 18 pp. (Jan. 23, 2017).

Amihai et al., "An Industrial Case Study Using Vibration Data and Machine Learning to Predict Asset Health," *2018 IEEE 20th Conference on Business Informatics (CBI)*, 1: 178-185 (Jul. 11-14, 2018).

Amihai et al., "Modeling Machine Health Using Gated Recurrent Units with Entity Embeddings and K-Means Clustering," *2018 IEEE 16th International Conference on Industrial Informatics (INDIN)*, 212-217 (Jul. 18-20, 2018).

De Brébisson et al., "Artificial Neural Networks Applied to Taxi Destination Prediction," *arXiv preprint arXiv:1508.00021*, 12 pp. (Sep. 21, 2015).

Gitzel et al., "Transforming condition monitoring of rotating machines," *ABB Review*, 58-63 (Feb. 1, 2019).

Guo et al., "Entity Embeddings of Categorical Variables," *arXiv preprint arXiv:1604.06737*, 9 pp. (Apr. 25, 2016).

Pascanu et al., "On the difficulty of training Recurrent Neural Networks," *Proceedings of the 30th International Conference on Machine Learning (ICML)*, 28(3): 12 pp. (Jun. 16-21, 2013).

European Patent Office, International Search Report in International Patent Application No. PCT/EP2020/057459, 4 pp. (dated May 25, 2020).

European Patent Office, Written Opinion in International Patent Application No. PCT/EP2020/057459, 8 pp. (dated May 25, 2020).

European Patent Office, Extended European Search Report in European Patent Application No. 19164552.2, 10 pp. (dated Sep. 25, 2019).

* cited by examiner

APPARATUS FOR PREDICTING EQUIPMENT DAMAGE

CROSS-REFERENCE TO PRIOR APPLICATION

This application is a continuation of International Patent Application No. PCT/EP2020/057459, filed on Mar. 18, 2020, which claims priority to European Patent Application No. EP 19164552.2, filed on Mar. 22, 2019. The entire disclosure of both applications is hereby incorporated by reference herein.

FIELD

One or more embodiments of the present invention may relate to an apparatus for predicting equipment damage, a system for predicting equipment damage, a method for predicting equipment damage, and/or a computer program element and computer readable medium.

BACKGROUND

Currently in process industries, inspection and maintenance of equipment with moving parts, such as rotating parts, predominantly contributes to operational expenses and there is a pressing need to keep them within admissible limits. For obvious reasons run to failure and reactive maintenance is not a desired maintenance strategy, as it leads to downtime. Sensors are becoming ever more affordable, and are starting to be used to monitor the health condition of such equipment in order to apply a predictive maintenance strategy. For example, a condition monitoring system (e.g. with vibration sensors) can help to predict the time to failure, provided the threshold values of the monitored values for alarm and warning are available. It is also required to know the actual time span from the time point the monitored variable reaches the alarm level until the actual failure will be experienced. However, it is problematic to determine reliable threshold levels for warnings, alarms.

There is a need to address this issue.

SUMMARY

In one or more embodiments, the present invention may provide an apparatus for predicting equipment damage. The apparatus may include an input unit, a processing unit, and an output unit. The input unit may be configured to provide the processing unit with sensor data for an item of equipment. The processing unit may be configured to implement at least one machine learning algorithm, where the at least one machine learning algorithm may have been trained on the basis of a plurality of calibration sensor data for the item of equipment. Training of the at least one machine learning algorithm may include processing the plurality of calibration sensor data to determine at least two clusters representative of different equipment states, where the processing unit may be configured to implement the at least one machine learning algorithm to process the sensor data to assign the sensor data to a cluster of the at least two clusters to determine an equipment state for the item of equipment. The output unit may be configured to output the equipment state for the item of equipment.

In one or more embodiments, the present invention may provide a method for predicting equipment damage. The method may include: training at least one machine learning algorithm on the basis of a plurality of calibration sensor data for an item of equipment, where training of the at least one machine learning algorithm may include processing the plurality of calibration sensor data to determine at least two clusters representative of different equipment states; implementing by a processing unit the at least one machine learning algorithm to process sensor data for the item of equipment to assign the sensor data to a cluster of the at least two clusters to determine an equipment state for the item of equipment; and outputting by an output unit the equipment state for the item of equipment.

Therefore, it would be advantageous to have an improved ability to monitor equipment with moving parts in order to detect if the equipment is or will deteriorate or become damaged.

The object of the present invention is solved with the subject matter of the independent claims, wherein further embodiments are incorporated in the dependent claims.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
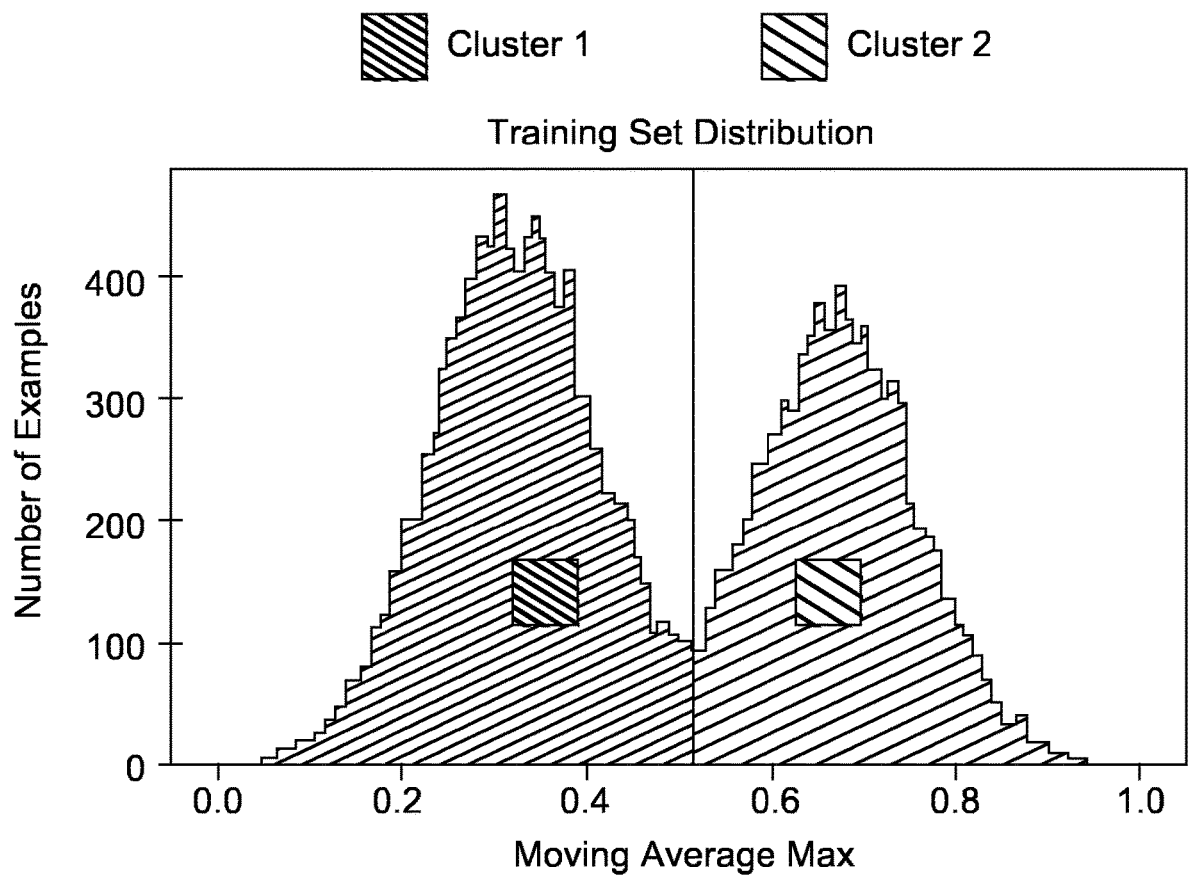
FIG. 1 shows an example of training sensor data, also termed calibration sensor data, that has been utilized to determine a number of clusters relating to different equipment states.

In a first aspect, there is provided an apparatus for predicting equipment damage, the apparatus comprising:
an input unit;
a processing unit; and
an output unit.

The input unit is configured to provide the processing unit with sensor data for an item of equipment. The processing unit is configured to implement at least one machine learning algorithm. The at least one machine learning algorithm has been trained on the basis of a plurality of calibration sensor data for the item of equipment. Training of the at least one machine learning algorithm comprises processing the plurality of calibration sensor data to determine at least two clusters representative of different equipment states. The processing unit is configured to implement the at least one machine learning algorithm to process the sensor data to assign the sensor data to a cluster of the at least two clusters to determine an equipment state for the item of equipment. The output unit is configured to output the equipment state for the item of equipment.

In this manner, a data-driven approach is provided to obtain reliable thresholds, through determining clusters, that is agnostic to the application, without a priori knowledge or pre-programmed information on the assets or equipment being is required.

The apparatus can be operating in real time, analyzing data as it is acquired, or can be operating in an offline mode to analyse data that was previously acquired by appropriate sensors.

In an example, training of the at least one machine learning algorithm comprises processing the plurality of calibration sensor data to determine a plurality of associated key condition indicator data. Determination of the at least two clusters can then comprise a determination of at least two distributions of key condition indicator data.

In an example, determination of the at least two distributions of key condition indicator data comprises transforming the key indicator data. Transformation can comprise utilization of a moving average calculation.

In an example, determination of the at least two distributions of key condition indicator data is based on at least two peaks in key condition indicator data.

In an example, determination of the at least two distributions of key condition indicator data is based on at least two peaks in transformed key condition indicator data.

In an example, processing of the sensor data comprises a determination of associated key condition indicator data.

In an example, the sensor data are velocity data and the calibration sensor data are velocity data. The associated key condition indicator data can then be root mean square velocity data.

In an example, the sensor data are rotational velocity data, and the calibration sensor data are rotational velocity data.

In an example, training of the at least one machine learning algorithm comprises utilization of user input data relating to an equipment state associated with at least one subset of the calibration data.

In an example, training of the at least one machine learning algorithm comprises utilization of user input data relating to a different equipment state associated with at least one second subset of the calibration data.

In a second aspect, there is provided a system for predicting equipment damage, the system comprising:
  at least one sensor; and
  an apparatus for predicting equipment damage according to the first aspect.

The at least one sensor is configured to acquire the sensor data and provide the sensor data to the processing unit.

Thus, a complete system is provided, with appropriate sensors such as rotational velocity sensors, that can then utilize at least one trained machine learning algorithm to determine in real time if an item of equipment is going to deteriorate.

In an example, the at least one sensor is configured to acquire the calibration sensor data.

In a third aspect, there is provided a method for predicting equipment damage, the method comprising:
  a) training at least one machine learning algorithm on the basis of a plurality of calibration sensor data for an item of equipment; wherein training of the at least one machine learning algorithm comprises processing the plurality of calibration sensor data to determine at least two clusters representative of different equipment states;
  b) implementing by a processing unit the at least one machine learning algorithm to process sensor data for the item of equipment to assign the sensor data to a cluster of the at least two clusters to determine an equipment state for the item of equipment; and
  c) outputting by an output unit the equipment state for the item of equipment.

According to another aspect, there is provided a computer program element controlling apparatus or system as previously described which, when the computer program element is executed by a processing unit, is adapted to perform the method steps as previously described.

According to another aspect, there is also provided a computer readable medium having stored the computer element as previously described.

The above aspects and examples will become apparent from and be elucidated with reference to the embodiments described hereinafter.

DETAILED DESCRIPTION OF EMBODIMENTS

Figure 2:
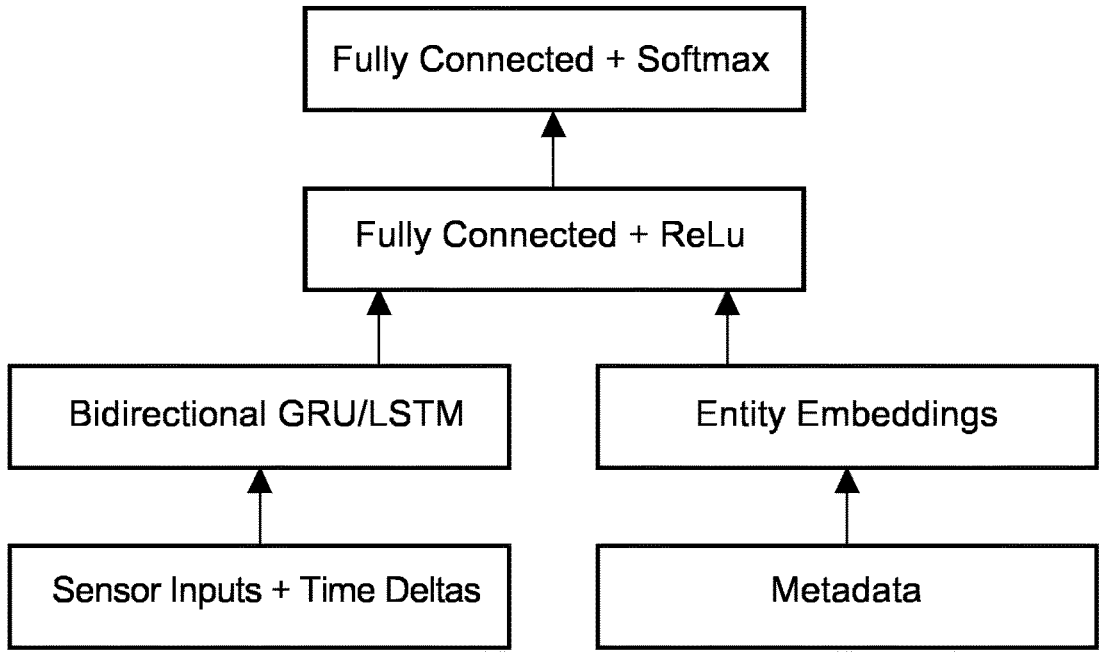
FIG. 2 shows an exemplar overview of a model architecture utilized in the apparatus, system and method.
Figure 3:
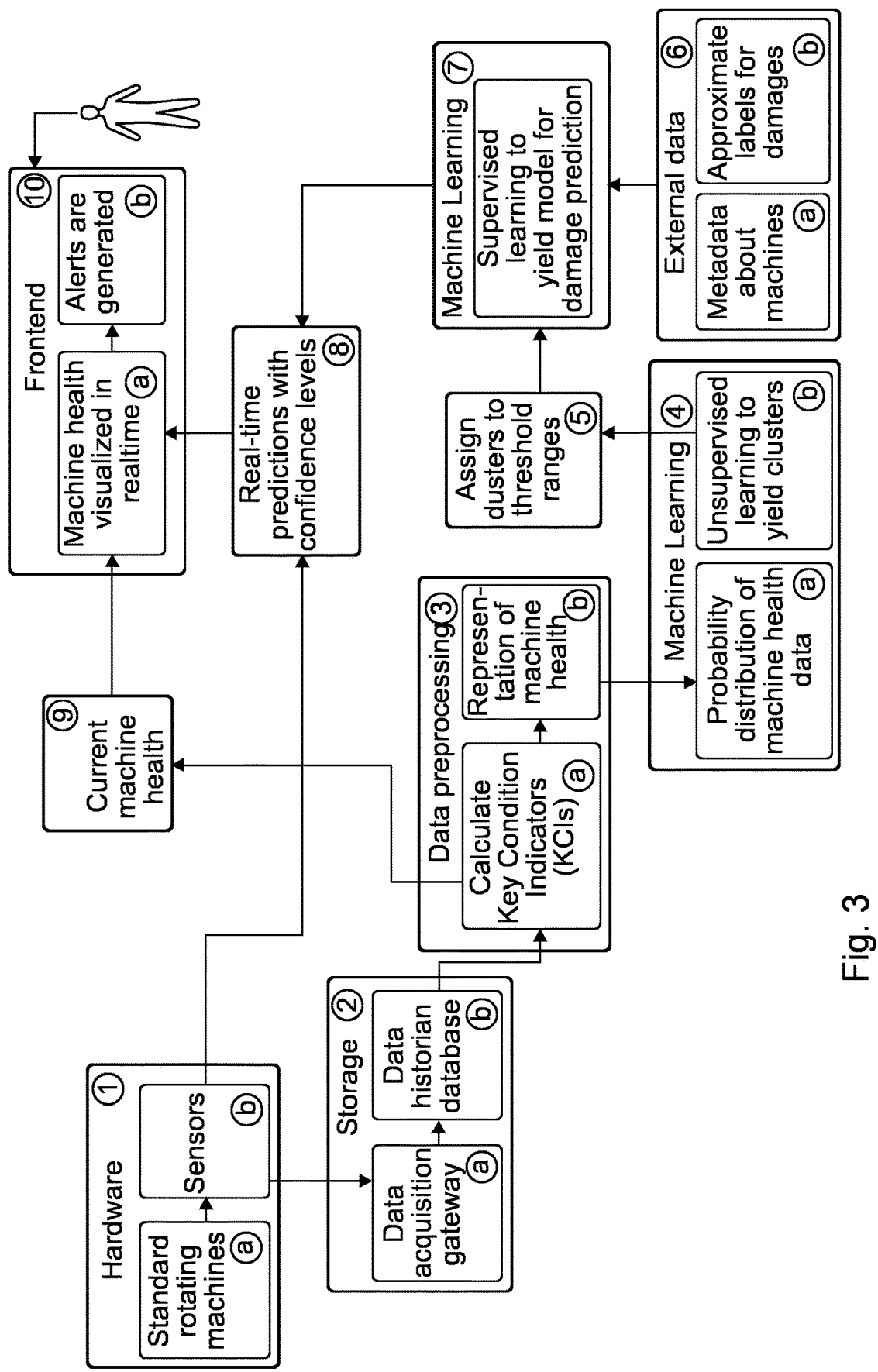
FIG. 3 shows a detailed representation of an example of the system.

FIGS. 1-3 relate to an apparatus for predicting equipment damage. The apparatus comprises an input unit, a processing unit, and an output unit. The input unit is configured to provide the processing unit with sensor data for an item of equipment. The processing unit is configured to implement at least one machine learning algorithm. The at least one machine learning algorithm has been trained on the basis of a plurality of calibration sensor data for the item of equipment. Training of the at least one machine learning algorithm comprises processing the plurality of calibration sensor data to determine at least two clusters representative of different equipment states. The processing unit is configured to implement the at least one machine learning algorithm to process the sensor data to assign the sensor data to a cluster of the at least two clusters to determine an equipment state for the item of equipment. The output unit is configured to output the equipment state for the item of equipment.

According to an example, training of the at least one machine learning algorithm comprises processing the plurality of calibration sensor data to determine a plurality of associated key condition indicator data. The determination of the at least two clusters can comprise a determination of at least two distributions of key condition indicator data.

According to an example, determination of the at least two distributions of key condition indicator data comprises transforming the key indicator data, the transformation comprises utilization of a moving average calculation.

According to an example, determination of the at least two distributions of key condition indicator data is based on at least two peaks in key condition indicator data.

According to an example, determination of the at least two distributions of key condition indicator data is based on at least two peaks in transformed key condition indicator data.

According to an example, processing of the sensor data comprises a determination of associated key condition indicator data.

According to an example, the sensor data are velocity data and the calibration sensor data are velocity data, and wherein the associated key condition indicator data are root mean square velocity data.

According to an example, the sensor data are rotational velocity data, and the calibration sensor data are rotational velocity data.

According to an example, training of the at least one machine learning algorithm comprises utilization of user input data relating to an equipment state associated with at least one subset of the calibration data.

According to an example, training of the at least one machine learning algorithm comprises utilization of user input data relating to a different equipment state associated with at least one second subset of the calibration data.

In an example, the user input data comprises information on an operational state of the item of equipment.

In an example, the information on the operational state of the item of equipment comprises one or more of: normal operation; abnormal operation.

In an example, the user input data comprises information on one or more of: a manufacturer of the item of equipment; an age of the equipment.

FIGS. 1-3 also relate to a system for predicting equipment damage, the system comprises at least one sensor configured to acquire the sensor data and provide the sensor data to the processing unit of the above described apparatus.

According to an example, the at least one sensor is configured to acquire the calibration sensor data.

Associated with the apparatus and system, as described above, is a method for predicting equipment damage. The method comprises:
- a) training at least one machine learning algorithm on the basis of a plurality of calibration sensor data for an item of equipment; wherein training of the at least one machine learning algorithm comprises processing the plurality of calibration sensor data to determine at least two clusters representative of different equipment states;
- b) implementing by a processing unit the at least one machine learning algorithm to process sensor data for the item of equipment to assign the sensor data to a cluster of the at least two clusters to determine an equipment state for the item of equipment; and
- c) outputting by an output unit the equipment state for the item of equipment.

In an example, step a) comprises processing the plurality of calibration sensor data to determine a plurality of associated key condition indicator data. Determining the at least two clusters comprises determining at least two distributions of key condition indicator data.

In an example, determining the at least two distributions of key condition indicator data comprises transforming the key indicator data. The transformation comprises utilizing a moving average calculation.

In an example, determining the at least two distributions of key condition indicator data is based on at least two peaks in key condition indicator data.

In an example, determining the at least two distributions of key condition indicator data is based on at least two peaks in transformed key condition indicator data.

In an example, step b) comprises determining associated key condition indicator data for the sensor data.

In an example, the sensor data are velocity data and the calibration sensor data are velocity data, and wherein the associated key condition indicator data are root mean square velocity data.

In an example, the sensor data are rotational velocity data, and the calibration sensor data are rotational velocity data.

In an example, step a) comprises utilizing user input data relating to an equipment state associated with at least one subset of the calibration data.

In an example, step a) comprises utilizing user input data relating to a different equipment state associated with at least one second subset of the calibration data.

Thus, existing problems relating to the utilisation of sensor data for health monitoring of equipment include:
- ISO thresholds for equipment with moving parts (such as standard rotating equipment) are either conservative or not sufficient to develop a predictive maintenance strategy;
- The required amounts of failure data are not available, as very few run-to-failure events are recorded in practical applications industry; and
- Reliable labels on the sensor data are not available over time and are not available with good quality.

The apparatus, system and method for predicting equipment damage described above addresses these issues, through:
- Autonomously predicting the health condition of the item of equipment (asset) using information from the sensors (data collected) and additional equipment metadata information like manufacture and age. This improves the performance of the maintenance operation and avoids human error and subjective errors;
- Automated Data Labeling: Using human collected assessment of plant equipment along with sensor readings from the condition monitoring to build up a training data set for machine learning later to be used with the data collected by condition monitoring system without human interaction; and
- Autonomous threshold for damages: Using sensor data with long history collected during periods covering normal operation and abnormal operation of assets and with statistical model and machine learning models, automated threshold ranges for normal and abnormal operating zones are generated. This improves the customization of thresholds for asset fleets.

Continuing with the figures, specific examples are now described in detail.

Asset health indicators are be determined, based on the distribution of a training dataset of sensor or Key Performance Indicators (KPI) values, in combination with application specifications provided by the customer and some domain knowledge. KPIs can also be termed Key Condition Indicators (KCI). It has been established that appropriate algorithms can be utilized that identify the health equipment. These algorithms result in the calculation of KPIs, whose values are inversely correlated with the equipment health. Hence, a prediction of the peak KPI value within a certain window can be thought of as an approximation of machine (or equipment) health. Additionally, to reduce the variance in the data, the KPI values can be transformed using a moving average (e.g. an exponentially decaying moving average). It should be noted that this method could also increase the validity of the machine health estimate, when estimates based on several measurements are more meaningful than single point measurements (e.g. a daily average vs a 6-hour single measurement), which is often the case.

An unsupervised clustering algorithm has been used to generate distinct classes based on the peak KPI values. Clustering algorithms aim at grouping data samples in such a way that samples that are nearer to each other using some distance measure (e.g. Euclidian distance) are grouped together. An example of a clustering algorithm is K-Means, which proceeds in the following manner:
1) Randomly initialize a set of K points;
2) Assign each point in the data to the nearest of the K points using some distance measure (e.g. Euclidean distance);
3) Calculate the new K points to be the centroids (i.e. the geometric means) of the observations in the new clusters;
4) Repeat 2 and 3 until the assignments don't change.

The number of clusters (e.g. K points) can be determined after an examination of the training data distribution and/or discussion with the asset manager.

FIG. 1 shows an example of an asset (item of equipment) health indicator, calculated as described above.

The maxima of the moving average of each sample in the training data are used to generate clusters using an unsupervised learning algorithm. As an illustration, here two clusters were formed.

As depicted in FIG. 1, the moving average of each data sample was first calculated using equation $V(t)=\beta*V(t-1)+(1-\beta)*\theta t)$, Where $\beta$ is the decay parameter, $\theta$ is the input at time t, and $V(t-1)$ is the previous value of the moving average. The decay parameter should be tuned according to the application, so that low values emphasize more recent information and high values are more conducive to reducing noise in the data. Subsequently, the maximum value of each moving average is provided as a sample to the clustering algorithm (e.g. the K-Means algorithm described above) in order to create the data labels.

In this detailed example, where reference is made to the "model" developed to aid description, the sensor data are fed to a bidirectional gated recurrent neural network (RNN), which implements long short-term memory (LSTM), gated recurrent units (GRU) or similar cells. In a bidirectional RNN architecture, one RNN reads the data forward, while a second RNN reads it backward through the signal, and the two final internal states of the RNNs are then concatenated together. The final internal state of an RNN contains more information about later inputs, and therefore the concatenation of the states of a bidirectional RNN can often better capture information about the entire sequence of data. More detail on this can be found in: I. Goodfellow, Y. Bengio, and A. Courville, "Deep Learning", MIT Press 2016. Moreover, the sampling interval between sample t and t-1 is provided as an additional input to the model. This is similar to that undertaken by M. Aczon M, D. Ledbetter, L. Ho, et al., "Dynamic mortality risk predictions in pediatric critical care using recurrent neural networks," ArXiv170106675 Cs Math Q-Bio Stat., 2017, which helps deal with irregularities in data sampling. In addition, the asset metadata are used to generate entity embeddings, where each categorical variable is mapped to a vector of fixed size, with parameters that are learned by the model (for further details on entity embeddings, please see A. de Brebisson, E. Simon, A. Auvolat, P. Vincent, and Y. Bengio, "Artificial neural networks applied to taxi destination prediction," arXiv preprint arXiv: 1508.00021, 2015, and G. Cheng, and F. Berkhahn, "Entity embeddings of categorical variables," arXiv preprint arXiv: 1604.06737, 2016. The overall model architecture is presented in FIG. 2. The embeddings are concatenated to the outputs of the RNN layer and fed to a fully connected neural network, whose final layer contains as many outputs equal to the number of clusters (i.e. predicted classes) and use a Softmax activation function.

The model in this specific example was trained using the log-loss function and tuned using the gradients of this function with respect to the parameters of the model using a variant of gradient descent (i.e. gradient based learning). In addition, gradient clipping was be applied by restricting the L2 norm or absolute value of the parameter gradients to be less than an empirically determined threshold to avoid potential gradient explosions. More detail on gradient explosions can be found in the paper by R. Pascanu, T. Mikolov, and Y. Bengio, "On the difficulty of training recurrent neural networks," Proceedings of the 30th International Conference on Machine Learning, ICML, pp. 1310-1318, June 2013. Simply put, this amounts to capping the values of the gradients. The hyperparameters, or the parameters not learned by the model are selected by calculating the loss function value using a separate validation set (e.g. the learning rate, batch size, number of units used in each layer of the model, amount of regularization (e.g. weight decay, dropout, the input size provided to the model, weight initialization values, and gradient clipping thresholds).

In a binary classification (i.e. the number of classes equals 2), the log-loss can be calculated as:

$$-\frac{1}{N}\sum_{n=1}^{N}[y_n\log(p_n)+(1-y_n)\log(1-p_n)]$$

where N is the number of samples, y are the true labels, and p are the predictions of the algorithm. If the number of classes is >2, the log-loss can be calculated as:

$$-\frac{1}{N}\sum_{n=1}^{N}\sum_{c=1}^{N}y_{nc}\log(p_{nc})$$

where M is the number of classes. In gradient based learning, the parameters of the learning algorithm are updated using the gradients of the loss function (e.g. log-loss) w.r.t. these parameters. Specifically, the partial derivative of the loss function w.r.t. each parameter is calculated and multiplied by a learning-rate, typically a small value that controls the speed of learning. Then, the product of the learning-rate and partial derivative is subtracted from the current value of the parameter. After each update, the loss-function is calculated again with the new parameter values, and this is repeated multiple times, typically 10 to several hundred or even thousands of repetitions.

In developing the described system, data obtained from 51 velocity sensors over a period of approximately 2.5 years was utilized. The KPI (or KCI) used was the root mean squared velocity values obtained approximately every 6 hours. Two clusters were generated using the first 1.5 years of data, and predicted on data from a subsequent 0.5-year range (a different 0.5-year dataset was also used as a validation set in order to tune the model's hyperparameters). The overall accuracy of this model was 96.1% (15330/15952), and the cluster prediction accuracies are summarized in the table below.

|  | Low KPI Cluster | High KPI Cluster |
| --- | --- | --- |
| Low KPI Cluster | 13942 (96.8%) | 164 (10.6%) |
| High KPI Cluster | 458 (3.2%) | 1388 (89.4%) |

FIG. 3 shows a schematic representation of an example of a complete system, showing the components of the system and highlighting the processes steps involved, as described below:

1a) This element represents the hardware component (the equipment whose condition is of interest) of the system e.g. liquid ring vacuum pumps.

1b) This element represents the hardware component (the sensor element which collects the data representing the health condition of the equipment of interest) of the system e.g. ABB sensors such as WIMONs.

2a) This element represents the data acquisition component of the system which collects the raw sensor data and transfers it to the next component for processing and analysis via e.g. Bluetooth gateway service.

2b) This element represents the storage medium in which the data are stored for further use.

3a) This element is one of the elements of the analytics component which contains the ABB developed algorithms to pre-process the raw sensor data and yield various key condition indicators that depicts the health condition of the equipment of interest.

3b) This element represents the machine health condition in a comprehensive form and contains different methods to extract this from the time series data e.g. peak of moving average within a certain window.

4a) This element is one of the machine learning component of the system which has a statistical engine to calculate the probability distribution of the machine's health condition.

4b) This element is another part of the machine learning component with an unsupervised learning engine to "cluster" the data based on features identified i.e. separated into groups such that the points within a group are very similar whilst being very different from the points in other groups.

5) This element is another analytical component which determines thresholds of machine health (e.g. 'keep running', 'wait and watch', 'needs attention') using a data-driven approach.

6a) This element of the system provides meta-data relating to the machines (e.g. names, manufacturers, types, etc.) which are provided by the customer (site where the machines are located) or OEM suppliers.

6b) This element is the input to another machine learning component where data relating to when machines were reported to have undergone damages is provided by the customer (site where the machines are located).

7) This element forms the basis for the machine learning component where supervised learning algorithms are applied to map inputs (e.g. recent machine health, asset type, etc.) to the thresholds for machine health, a given time-period in the future (e.g. 2 weeks ahead).

8) This element is responsible for the real-time prediction of the machine health by receiving the data from the sensors, processing it to prepare the KCI for comparing it with the learnt prediction model (see 7) and output a predicted machine health for a given time period in the future (e.g. 2 weeks ahead).

9) This element provides the current machine health derived by comparing the Key Condition Indicators to known thresholds (e.g. ISO thresholds or data-driven thresholds, see 5).

10a) This element is one of the visualization components of the system and presents the summary of the health conditions of the equipment fleet.

10b) This element is the other part of the visualization component and contains the alert mechanisms to inform the customer about the machine health based on user defined configurations.

The overall process can therefore be summarized as follows:

Sensors attached to assets of interest collect the data on the parameters that define the health of the asset either directly or indirectly. The sensor data are then pre-processed and crunched by algorithms to calculate the key condition indicators that indicates the health condition of the assets. With a statistical analysis, and using unsupervised machine learning model development with specific features, clusters are created which are then assigned to threshold ranges that represent normal and damaged information. Based on labelled data and using a supervised learning approach the real-time sensor data are then pre-processed and compared with the labelled data to predict the damages in the prediction window (e.g. 2 weeks ahead) and represented through a visualization medium with an alert generation unit to alert the user to take a maintenance action.

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

According to a further exemplary embodiment of the present invention, a computer readable medium, such as a CD-ROM, is presented wherein the computer readable medium has a computer program element stored on it which computer program element is described by the preceding section.

While one or more embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An apparatus for predicting equipment damage, the apparatus comprising:
an input;
a processor; and
an output;
wherein the input is configured to provide the processor with sensor data for an item of equipment,
wherein the processor is configured to implement at least one machine learning algorithm,
wherein the at least one machine learning algorithm has been trained based on a plurality of calibration sensor data for the item of equipment, wherein training of the at least one machine learning algorithm comprises:
    processing the plurality of calibration sensor data to determine a plurality of associated key condition indicator data,
    transforming the key condition indicator data using a moving average calculation over time to obtain transformed key condition indicator data, and
    determining at least two clusters representative of different equipment states by determining at least two distributions of the transformed key condition indicator data,
wherein the processor is configured to implement the at least one machine learning algorithm to process the sensor data to assign the sensor data to a cluster of the at least two clusters to determine an equipment state for the item of equipment, and
wherein the output is configured to output the equipment state for the item of equipment.

2. The apparatus according to claim 1, wherein: the moving average calculation is performed using an equation $V(t)=\beta*V(t-1)+(1-\beta)*\theta(t)$, wherein $V(t)$ is a value of the moving average for a current time t, $V(t-1)$ is a value of the moving average for a previous time t−1, $\beta$ is a decay parameter, and $\theta(t)$ is an input at time t.

3. The apparatus according to claim 1, wherein the determination of the at least two distributions of the transformed key condition indicator data is based on at least two peaks in the transformed key condition indicator data.

4. The apparatus according to claim 1, wherein:
    the sensor data are velocity data and the calibration sensor data are velocity data, and
    the associated key condition indicator data are root mean square velocity data.

5. The apparatus according to claim 4, wherein the sensor data are rotational velocity data, and the calibration sensor data are rotational velocity data.

6. The apparatus according to claim 1, wherein training of the at least one machine learning algorithm comprises utilization of user input data relating to an equipment state associated with at least one subset of the calibration data.

7. The apparatus according claim 6, wherein training of the at least one machine learning algorithm comprises utilization of user input data relating to a different equipment state associated with at least one second subset of the calibration data.

8. A system for predicting equipment damage, the system comprising:
    at least one sensor; and
    the apparatus for predicting equipment damage according to claim 1,
    wherein the at least one sensor is configured to acquire the sensor data and provide the sensor data to the processor.

9. The system according to claim 8, wherein the at least one sensor is configured to acquire the calibration sensor data.

10. A method for predicting equipment damage, the method comprising:
    training at least one machine learning algorithm based on a plurality of calibration sensor data for an item of equipment, wherein training of the at least one machine learning algorithm comprises:
        processing the plurality of calibration sensor data to determine a plurality of associated key condition indicator data,
        transforming the key condition indicator data using a moving average calculation over time to obtain transformed key condition indicator data, and
        determining at least two clusters representative of different equipment states by determining at least two distributions of the transformed key condition indicator data;
    implementing by a processor the at least one machine learning algorithm to process sensor data for the item of equipment to assign the sensor data to a cluster of the at least two clusters to determine an equipment state for the item of equipment; and
    outputting the equipment state for the item of equipment.

11. A non-transitory computer-readable medium that stores a computer program, which upon execution by a processor, causing performance of a method, the method comprising:
    training at least one machine learning algorithm based on a plurality of calibration sensor data for an item of equipment, wherein the training of the at least one machine learning algorithm comprises:
        processing the plurality of calibration sensor data to determine a plurality of associated key condition indicator data,
        transforming the key condition indicator data using a moving average calculation over time to obtain transformed key condition indicator data, and
        determining at least two clusters representative of different equipment states by determining at least two distributions of the transformed key condition indicator data;
    implementing the at least one machine learning algorithm to process sensor data for the item of equipment to assign the sensor data to a cluster of the at least two clusters to determine an equipment state for the item of equipment; and
    outputting the equipment state for the item of equipment.

* * * * *